United States Patent [19]
Lew

[11] Patent Number: 5,131,270
[45] Date of Patent: Jul. 21, 1992

[54] SLIDING ROTOR PUMP-MOTOR-METER

[76] Inventor: Hyok S. Lew, 7890 Oak St., Arvada, Colo. 80005

[21] Appl. No.: 565,070

[22] Filed: Aug. 10, 1990

[51] Int. Cl.$^5$ .................................................. G01F 3/02
[52] U.S. Cl. ........................................... 73/259; 418/54
[58] Field of Search ................... 73/253, 261; 418/7, 418/13, 255, 54

[56] References Cited

U.S. PATENT DOCUMENTS

| | | | |
|---|---|---|---|
| 302,179 | 7/1984 | Walker | 418/54 |
| 858,144 | 6/1907 | Bey | 418/13 |
| 901,539 | 10/1908 | Leyner | 418/13 |
| 917,724 | 4/1909 | Elliott et al. | 418/13 |
| 1,255,699 | 2/1918 | Bradley | 73/259 X |
| 3,226,014 | 12/1965 | Janenkov | 418/13 |
| 3,873,245 | 3/ | Doshi | 418/54 X |
| 4,646,568 | 3/1987 | Lew | 73/260 |

FOREIGN PATENT DOCUMENTS 1105430 4/1961 Fed. Rep. of Germany ........... 418/7

OTHER PUBLICATIONS

Simens et al. No. 14531 1903 FIGS. 1–3 only.

Primary Examiner—Herbert Goldstein

[57] ABSTRACT

An apparatus for generating and/or measuring fluid flow and/or generating power from fluid flow comprises two combinations of a cylindrical cavity and a divider member rotatably disposed in the cylindrical cavity about an axis of rotation parallel and eccentric to the geometrical central axis of the cylindrical cavity, which divider member extends across the cylindrical cavity on a plane including the axis of rotation in all instances of rotating movement thereof, and a rotary motion coupling means coupling rotating motions of the two divider members in such a way that a phase angle difference of ninety degrees in the rotating motion between the two divider members is maintained, wherein fluid moving through the two cylindrical cavities and crossing each plane including the geometrical central axis and the axis of rotation in each of the two cylindrical cavities relates to rotating motion of the two divider members.

13 Claims, 3 Drawing Sheets

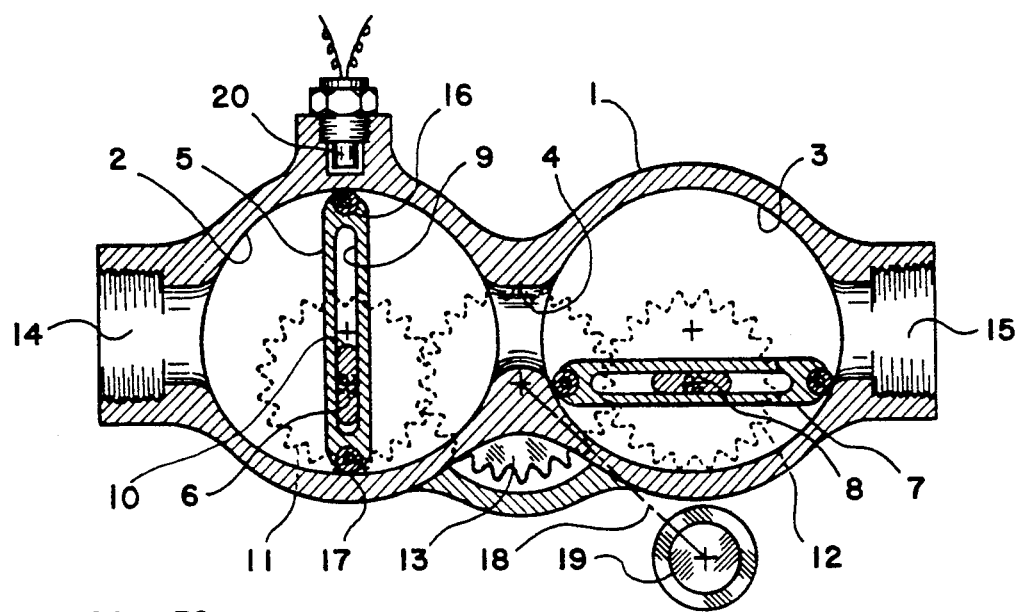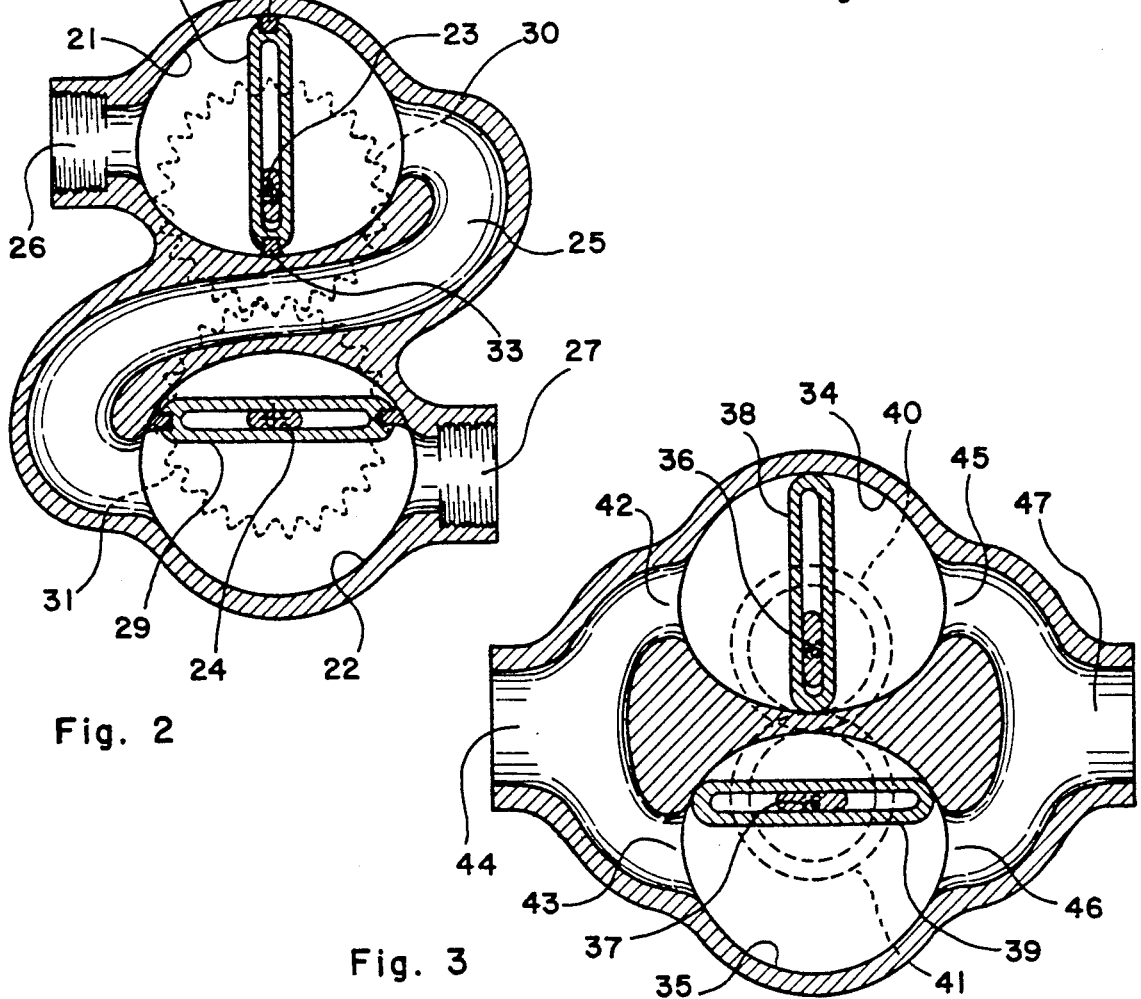

SLIDING ROTOR PUMP-MOTOR-METER

BACKGROUND OF THE INVENTION

Most existing types of the rotary positive displacement pumps and flowmeters have many moving parts, which have complex shapes and, consequently, they are not suitable or ideal for the construction of a pump or flowmeter of small size or those capable of measuring low volume flow rates. With few exceptions, the existing rotary positive displacement pumps or flowmeters employ a plurality of vanes or flaps included in a rotor assembly eccentrically disposed within a cavity in a rotatable arrangement. Since many moving parts are assembled into a single rotor assembly, firstly higher friction resulting from the movement of the individual parts make the existing rotary positive displacement flowmeter incapable of measuring low flow rates of fluids and, secondly, they are not suitable for construction into a pump or flowmeter of small size. These difficulties associated with the existing rotary positive displacement pump or flowmeter can be eliminated by employing a design including a single sliding rotor or vane disposed in a cavity wherein the sliding rotor or vane divides the cavity into two compartments during all phases of rotation thereof about an axis of rotation eccentric to the geometrical central axis of the cavity.

BRIEF SUMMARY OF THE INVENTION

The primary object of the present invention is to provide a pump or motor or flowmeter comprising at least two cylindrical cavities, each of which includes a dividing member mounted on a shaft member disposed parallel and eccentrically to the geometrical central axis of the cavity in a slidable arrangement, wherein the dividing member divides the cavity into two compartments during all phases of rotation thereof. The rotating motion of the two dividing members respectively included in the two cylindrical cavities are coupled to one another in such a way that there is 90 degrees of phase angle difference in the rotating motion between the two dividing members, whereby the motion of a fluid moving through the two cylindrical cavities generates or is generated by the rotating motion of at least one of the two dividing members in all instances.

Another object of the present invention is to provide a pump or motor or flowmeter comprising at least two circular cylindrical cavities, each of which includes a dividing member comprising a planar member mounted on a shaft member disposed parallel and eccentric to the central axis of the circular cylindrical cavity in a slidable arrangement and two edge members respectively connected of the two opposite edges of the planar member in a slidable arrangement, wherein the dividing member divides the circular cylindrical cavity into two compartments during all phases of rotation thereof. The rotating motion of the two dividing members respectively included in the two circular cylindrical cavities are coupled to one another in such a way that there is a 90 degree phase angle difference in the rotating motion between the two dividing members whereby the motion of a fluid moving through the two circular cylindrical cavities generates or is generated by the rotating motion of at least one of the two dividing members in all instances.

A further object of the present invention is to provide the pump or motor or flowmeter described by the aforementioned objects of the present invention, wherein each combination of the dividing member and cavity includes at least one combination of cam follower and cam guide, which controls contact pressure between the edges of the dividing member and the cylindrical wall of the cavity whereby friction therebetween is maintained at an acceptable level.

These and other object of the present invention will become clear as the description thereof progresses.

BRIEF DESCRIPTION OF THE FIGURES

The present invention may be described with a greater clarity and specificity by referring to the following figures:

FIG. 1 illustrates a cross section of an embodiment of the sliding rotor pump-motor-meter of the present invention.

FIG. 2 illustrates a cross section of another embodiment of the sliding rotor pump-motor-meter.

FIG. 3 illustrates a cross section of a further embodiment of the sliding rotor pump-motor-meter.

DESCRIPTION OF THE ILLUSTRATED EMBODIMENTS

Figure 4:
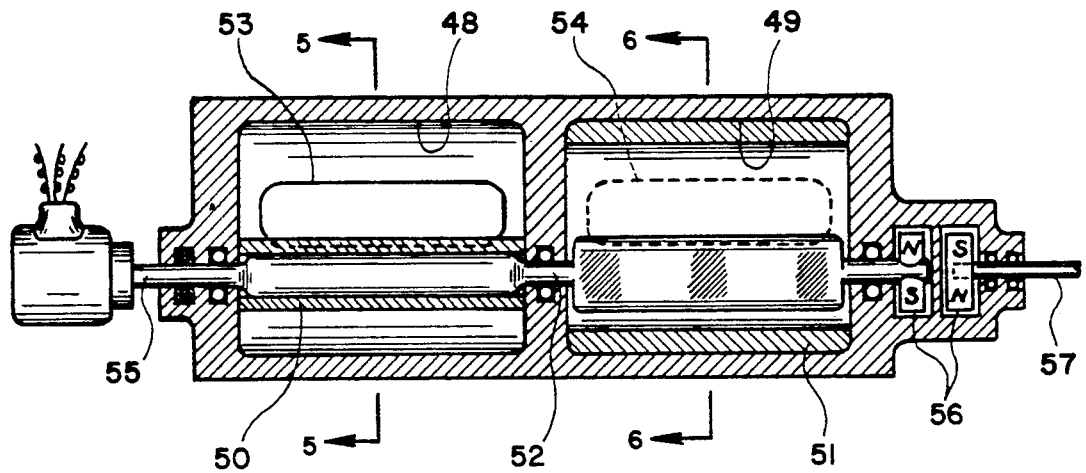
FIG. 4 illustrates a cross section of yet another embodiment of the sliding rotor pump-motor-meter.

In FIG. 1 there is illustrated a cross section of an embodiment of the sliding rotor pump-motor-meter constructed in accordance with the principles of the present invention. The body 1 of the apparatus includes at least two cylindrical cavities 2 and 3 with two closed ends disposed in a parallel and adjacent relationship to one another, which two cylindrical cavities are open to one another by a connecting port 4 extending through the cylindrical wall thereof. The two cylindrical cavities 2 and 3 respectively include the planar dividing member 5 mounted on a shaft member 6 and the planar dividing member 7 mounted on a shaft member 8, wherein the shaft member is disposed parallel and eccentric to the geometrical central axis of the cylindrical cavity and the planar dividing member is mounted thereon in a slidable arrangement on a plane including the planar dividing member. The cross section of the cylindrical cavity taken along a plane perpendicular to the central axis of the shaft member has a generally round shape that has a constant diametrical dimension passing through the central axis of the shaft member. The portion of the shaft member engaging the oblong slotted hole 9 included in the planar dividing member has a flattened section 10, whereby the rotating motion of the planar dividing member 5 and that of the shaft member 6 are coupled to one another. Two identical gears 11 and 12 respectively mounted on the two shaft members 6 and 7 in an affixed arrangement simultaneously engage a coupling gear 13, which arrangement couples the rotating motions of the planar dividing members 5 and 6 to one another in such a way that 90 degrees of phase angle difference exists between the rotating motions of the two planar dividing members 5 and 6 in all instances. If sliding rotor pump-motor-meter comprises more than two combinations of the planar dividing member and the cylindrical cavity, the phase angle difference between two adjacent planar dividing members must be generally equal to 180 degrees divided by the total number of planar dividing members included in the apparatus. An inlet port 14, outlet port 15 and the connecting port 4 have a generally straight common central axis perpendicular to a plane including the geometrical central axis of the cylindrical cavity and the central axis of the shaft member in each of the two cylindrical cavities 2 and 3. In order to facilitate the rotation of the planar dividing members, rollers 16 and 17 may be included, which are disposed along the edges of the planar dividing member sliding on the cylindrical wall of the cavity. When the apparatus operates as a pump or motor, power input or take off means such as a shaft 18 with a coupling means 19 extending from the gear 13 must be included. When the apparatus operates as a flowmeter, a means for measuring the rotating speed of one of the two planar dividing members such as a proximity or velocity sensor 20 measuring the passing frequency of the edges of the planar dividing member must be included. Of course, the magnetic rotary motion transmission means included in the embodiment shown in FIG. 4 may be connected to the shaft of the gear 13 as an alternative means for measuring the rotating speed of the planar dividing members. It is readily noticed that at least one of the two planar dividing members 5 and 6 blocks the flow passage from the inlet port to the outlet port and that the fluid pressure difference across the planar dividing member rotates the planar dividing member about the central axis of the shaft supporting the planar dividing member in an eccentric arrangement. Therefore, fluid moving through the apparatus rotates the planar dividing members in a positive displacement relationship, on which principle the apparatus of the present invention operates as a positive displacement motor or flowmeter. The rotation of the planar dividing members by means of power input transmitted by the shaft 18 moves the fluid through the apparatus in a positive displacement relationship, on which principle, the apparatus of the present invention operates as a positive displacement pump. It is readily recognized that the apparatus of the present invention can be modified to a semi-positive displacement device by increasing the dimensions of the inlet and outlet ports 14 and 15, and the connecting port 5 in directions perpendicular to the geometrical central axis of the cylindrical cavity, whereby there are instances during each cycle of rotation of the planar dividing members wherein neither of the two planar dividing members 5 and 6 completely blocks the flow passage from the inlet port 14 to the outlet port 15.

In FIG. 2 there is illustrated a cross section of another embodiment of the sliding rotor pump-motor-meter of the present invention. In the embodiment shown in FIG. 1, the two cylindrical cavities 2 and 3 are disposed in a side-by-side arrangement, wherein the plane including the geometrical central axis of the cylindrical cavity and the central axis of the shaft member disposed in the first cylindrical cavity is parallel and off-set from that of the second cylindrical cavity. In the embodiment shown in FIG. 1, the two cylindrical cavities 21 and 22 are disposed in such a way that the geometrical central axes thereof as well as the central axes of the two shaft members 23 and 24 respectively disposed therein are located on a common plane. The connecting port 25 of an S-shaped configuration connects the second half of the first cylindrical cavities 21 to the first half of the second cylindrical cavity 22, while the inlet port 26 is open to the first half of the first cylindrical cavity 21 and the outlet port 27 is open to the second half of the second cylindrical cavity 22. The rotating motion of the two planar dividing members 28 and 29 are coupled to one another by two gears 30 and 31 respectively mounted on the two shaft members 23 and 24 in an affixed arrangement and directly engaging one another, which gears maintains 90 degrees phase angle difference in the rotating motion between the two planar dividing members 28 and 29. The edges of the planar dividing members include sliding seals 32 and 33 in place of the rollers 16 and 17 included in the embodiment shown in FIG. 1. The apparatus shown in FIG. 2 operating as a positive displacement apparatus may be modified to a semi-positive displacement apparatus by opening up the sizes of the inlet and outlet ports, and the coverting ports as mentioned in conjunction in FIG. 1.

In FIG. 3 there is illustrated a cross section of a further embodiment of the sliding rotor pump-motor-meter comprising two cylindrical cavities 34 and 35 disposed in a parallel arrangement, wherein the geometrical central axes thereof as well as the central axes of the shaft members 36 and 37 are located on a common plane. The rotating motions of the two planar dividing members 38 and 39 are coupled to one another by two gears 40 and 41, which maintains 90 degrees phase angle difference between the rotating motions of the two planar dividing members 38 and 39. The two flow passages 42 and 43 respectively open to the first halves of the two cylindrical cavities 34 and 35 located on one side of the plane including the central axes of the shaft members 36 and 37 merges to form an inlet port 44, while the two flow passages 45 and 46 respectively open to the second halves of the two cylindrical cavities 34 and 35 located on the other side of the plane including the central axes of the shaft members 36 and 37 merges to form an outlet port 47. It is readily recognized that the apparatus shown in FIG. 3 is a semi-positive displacement pump or motor or flowmeter instead of a positive displacement counterpart thereof. It is noticed that the planar dividing members included in the embodiment shown in FIG. 3 have plain edges without rollers or seals. The planar dividing members employed in the sliding rotor pump-motor-meter of the present invention may have plain edges or rollers or seals.

In FIG. 4 there is illustrated a cross section of yet another embodiment of the sliding rotor pump-motor-meter, that comprises at least two cylindrical cavities of the same cross sectional geometry as that described in conjunction with FIG. 1, which are now disposed in a coaxial arrangement instead of the side-by-side arrangement shown in FIGS. 1, 2 and 3. The planar dividing members 50 and 51 are mounted on a common shaft member 52 extending through the two cylindrical cavities 48 and 49 in a parallel and eccentric relationship to the common geometrical central axis of the two cylindrical cavities, wherein the planar dividing members and the shaft member rotate together, while the former are slidable relative to the latter on planes including them. Of course, there is 90 degrees phase angle difference between the rotary position between the two planar dividing members 50 and 51. If the apparatus includes more than two combinations of the planar dividing member and the cylindrical cavity, the phase angle difference between two adjacent planar dividing members is generally equal to 180 degrees divided by the total number of the combinations of the planar dividing member and the cylindrical cavity. Each of the two cylindrical cavities has its own inlet and outlet ports as exemplified by the ports 53 and 54. When the apparatus operates as a pump or motor, an extremity 55 of the shaft member 52 with a rotary motion coupling means extending out of the cylindrical cavities provides a means for power input to or take off from the apparatus, while a rotary speed measuring means such as a magnetic transmission 56 transmitting the rotating motion of the shaft member 52 to a coaxially and externally disposed shaft 57 connected to a rotary motion counter provides a means for indicating the flow rate of fluid, when the apparatus operates as a flowmeter. Of course, other types of rotary speed sensor such as the element 20 included in the embodiment shown in FIG. 1 may be employed in place of the magnetic transmission 56. Depending on the arrangement and connection of the ports such as the elements 53, 54, etc., the sliding rotor pump-motor-meter shown in FIG. 4 may operate as the embodiment shown in FIG. 1 or 2 or 3. The advantage provided by the embodiment shown in FIG. 4 over those shown in FIGS. 1, 2 and 3 is the elimination of the gears coupling the rotating motion of the two planar dividing members, while the disadvantage is an additional pressure drop in the fluid arising from the series arrangement of the cylindrical cavities. It should be mentioned that the planar dividing members employed in the sliding rotor pump-motor-meter of the present invention may be constructed in a rigid or semi-rigid structure, or rigid main body structure with resilient edges.

Figure 5:
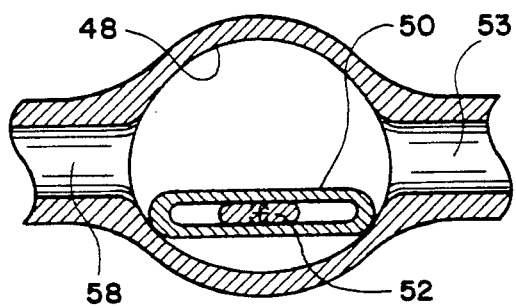
FIG. 5 illustrates another cross section of the embodiment shown in FIG. 4.

In FIG. 5 there is illustrated another cross section of the embodiment shown in FIG. 4, which cross section taken along plane 5—5 as shown in FIG. 4 shows the first planar dividing member 50 rotatably disposed within and dividing the first cylindrical cavity 48 into two compartments. The ports 53 and 58 are respectively open to the two halves of the cylindrical cavity 48 located on the two opposite sides of a plane including the geometrical central axis of the cylindrical cavity 48 and the central axis of the shaft member 52. As described in conjunction with FIG. 1, the flattened section of the shaft member 52 engaging the slotted hole included in the planar dividing member 50 couples the rotating motion thereof together, while it allows sliding motion therebetween on a plane including the planar dividing member.

Figure 6:
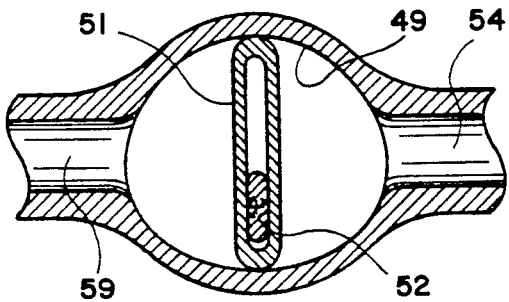
FIG. 6 illustrates a further cross section of the embodiment shown in FIG. 4.

In FIG. 6 there is illustrated further cross section of the embodiment shown in FIG. 4, which cross section is taken along plane 6—6 as shown in FIG. 4. The combination of the cylindrical cavity 49 and the planar dividing member 52 has the same construction and arrangement as that of the combination of the cylindrical cavity 48 and the planar dividing member 50 shown in FIG. 5 with one exception that is the phase angle difference of 90 degrees existing in the rotary positions of the two planar dividing members. The ports 54 and 59 are respectively open to the two halves of the cylindrical cavity 49 located on the two opposite sides of a plane including the geometrical central axis of the cylindrical cavity 49 and the central axis of the shaft member 52. When the ports 54 and 58 are connected to one another, and the ports 53 and 59 are used as an inlet and outlet ports, the apparatus shown in FIG. 4 operates in the same way as the apparatus shown in FIG. 1 or 2. When the ports 53 and 54 are connected to a common inlet port in a parallel arrangement and the ports 58 and 59 are connected to a common outlet port in a parallel arrangement, the apparatus shown in FIG. 4 operates in the same way as the apparatus shown in FIG. 3.

Figure 7:
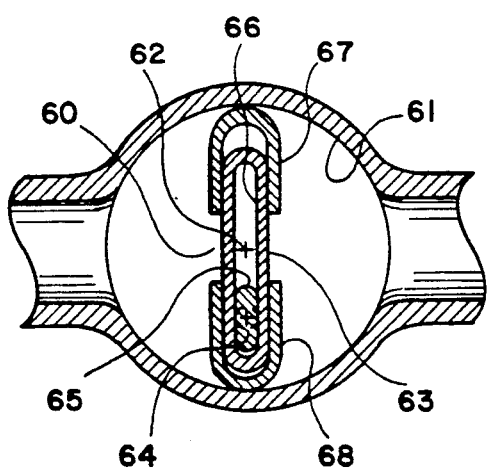
FIG. 7 illustrates a cross section of an embodiment of the combination of a sliding rotor and a circular cylindrical cavity, which combination may be employed in the construction of the sliding rotor pump-motor-meter of the present invention.

In FIG. 7 there is illustrated a cross section of a modified version of the combination of the planar dividing member 60 and the cylindrical cavity 61, which combination may be employed in the construction of the sliding rotor pumpmotor-meter of the present invention in place of the combinations of the combinations of the corresponding elements employed in the embodiments shown in FIGS. 1, 2, 3 and 4. In this modified combination, the cylindrical cavity 61 is a circular cylindrical cavity having a circular cross section with center 62. The planar dividing member 60 comprises a planar member 63 mounted on the shaft member 64 in a slidable arrangement, wherein the flattened section 65 of the shaft member 64 engaging the slotted hole 66 included in the planar member 63 couples the rotating motions thereof to one another. The two edges of the planar member 63 respectively include two slidable edge members 67 and 68 connected to and supported by the edge portions of the planar member 63 in a slidable arrangement, whereby the edge-to-edge dimension of the planar dividing member 60 varies as the planar dividing member 60 rotates about the central axis of the shaft member 64 and the extendably and retractably disposed edge members 67 and 68 slides on the circular cylindrical wall of the cylindrical cavity 61. It is readily recognized that the modified embodiment of the combination of the planar dividing member and the circular cylindrical cavity shown in FIG. 7 provides an advantage over the counter-part thereof employed in the embodiments shown in FIGS. 1, 2, 3 and 4 in view that there is much less resistance against the rotation of the planar dividing member when the edges thereof follow the circular cylindrical wall of the cylindrical cavity. Of course, the disadvantage is the additional moving parts included in the planar dividing member, which makes the apparatus more expensive. It should be understood that the rollers 16 and 17 included in the embodiment shown in FIG. 1, or the seals 32 and 33 included in the embodiment shown in FIG. 2 may be incorporated into the edge members 67 and 68 included in the embodiment shown in FIG. 7. It should be further understood that one of the two edge members 67 and 68 may be affixed to the planar member 63, or one of the two edge members such as the element 68 can be eliminated and one of the two edges of the planar member now without the edge member 68 may be extended to establish a sliding contact with the circular cylindrical wall of the cylindrical cavity.

Figure 8:
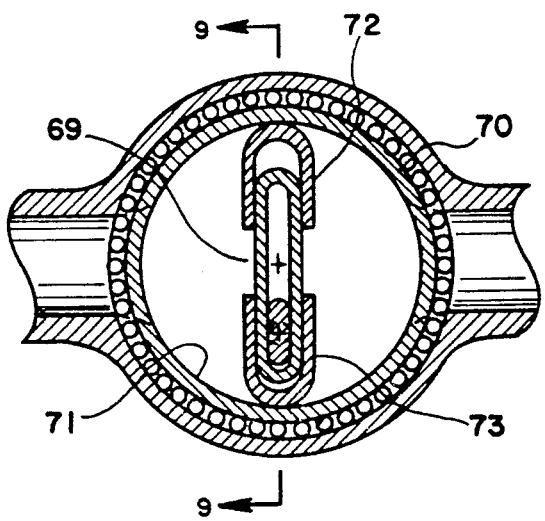
FIG. 8 illustrates a cross section of another embodiment of the combination of a sliding rotor and a circular cylindrical cavity.

In FIG. 8 there is illustrated a cross section of another modified combination of the planar dividing member 69 and a circular cylindrical cavity 70, which has the same constructions and arrangements as the embodiment shown in FIG. 7 with one exception, which is one or a plurality of rings 71 included in the circular cylindrical wall of the cylindrical cavity 71, which ring with one or more frictionless bearings is freely rotatable and has the inner circular cylindrical surface generally flush to and slightly above the circular cylindrical surface of the cylindrical cavity. The ring 70 rotates with the edge members 72 and 73 of the planar dividing member 69 under the friction therebetween.

Figure 9:
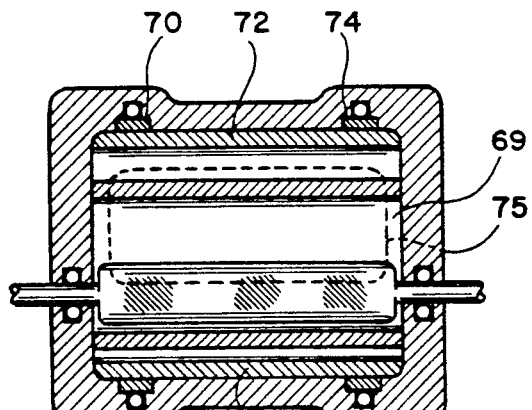
FIG. 9 illustrates another cross section of the combination shown in FIG. 8.

In FIG. 9 there is illustrated another cross section of the combination shown in FIG. 8, which cross section taken along plane 9—9 as shown in FIG. 8 illustrates a pair of rotatively disposed rings 70 and 74 respectively disposed adjacent to the two end walls of the circular cylindrical cavity, which provides rotating support for the two edge members 72 and 73 of the planar dividing member 69. It is noticed that the inlet and outlet ports exemplified by the port opening 75 are disposed through the middle portion of the circular cylindrical wall of the cylindrical cavity intermediate the two rings and, consequently, the two rings 70 and 74 do not obstruct any flow of the fluid moving through the apparatus.

Figure 10:
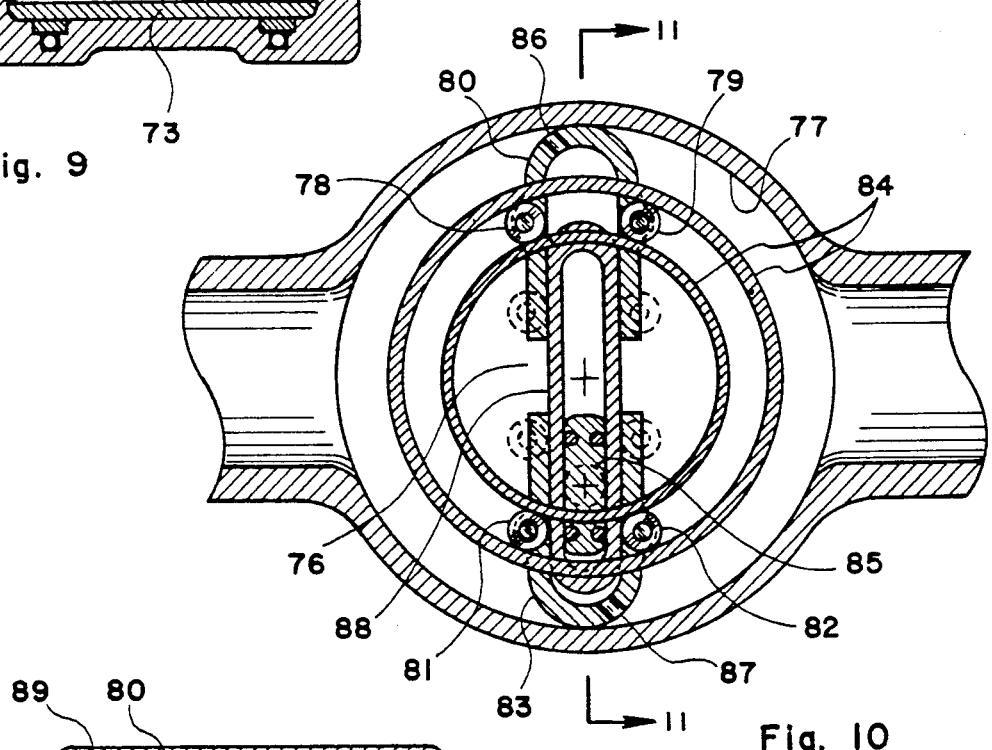
FIG. 10 illustrates a cross section of a further combination of a sliding rotor and a circular cylindrical cavity.

In FIG. 10 there is illustrated a cross section of a further modified combination of the planar dividing member 76 and the circular cylindrical cavity 77, which has the same constructions and arrangements as the combination shown in FIG. 7 with one exception, that is the inclusion of the cam followers 78 and 79 anchored to one end of the first movable edge member 80, and the cam followers 81 and 82 anchored to one end of the second movable edge member 83. The cam followers 78, 77, 81, 82, etc. guided by a circular cam guide 84, which may be stationary or freely rotatable about its central axis coinciding with the central axis of the circular cylindrical cavity 77, limits or eliminates the contact between the movable edge members 80 and 83 of the planar dividing member 76 and the circular cylindrical wall of the cylindrical cavity, and thus facilitates the rotation of the planar dividing member 76. The stationary or rotating cam guide 84 may have the minimum radius that clears the shaft member 85 as in the case of the particular embodiment shown in FIG. 10. In an alternative embodiment, the cam guide may have the maximum radius that clears the shaft member 85, wherein the cam followers are now located at positions outlined by the broken lines. The movable edge members 80 and 81 may include a series of vent holes 86, 87, etc. in order to facilitate the sliding movements thereof relative to the planar member 88 slidably and nonrotatably mounted on the shaft member 85. It should be understood that only one cam follower instead of the pair may be anchored to each end of each movable edge member.

Figure 11:
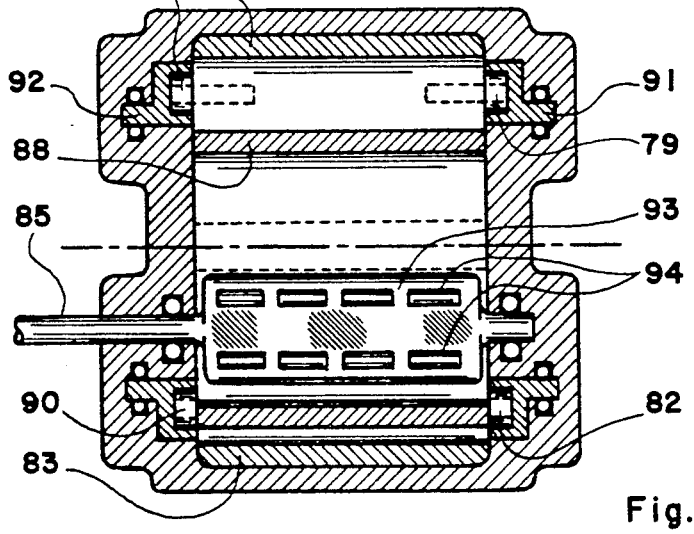
FIG. 11 illustrates another cross section of the combination shown in FIG. 10.

In FIG. 11 there is illustrated another cross section of the combination shown in FIG. 10, which shows cam followers 79, 82, etc. anchored to the first ends of the movable edge members 80 and 83 and engaging a rotatable circular cam guide 91, and cam followers 89, 90, etc. anchored to the second ends of the movable edge members 80 and 83 and engaging a rotatable circular cam guide 92. The flattened portion 93 of the shaft member 85 may include a plurality of roller bearings 94 included in both sides thereof, which facilitate the sliding movement of the planar member relative thereto. It should be understood that the circular cam guides may have only one of the external or internal circular cylindrical guide surface instead of both thereof included in the particular embodiment shown in FIG. 11. It is readily realized that the embodiments of the sliding rotor pump-motor-flowmeter shown in FIGS. 1, 2, 3 and 4 may include the combinations of the cam followers and cam guides, which are similar to the counterpart shown in FIGS. 10 and 11. Since the cylindrical cavities included in the embodiment shown in FIGS. 1, 2, 3 and 4 are not exactly a circular cylindrical cavity, the cam guide grooves included in those embodiments must be stationary and have a contour concentric and similar to the cross sectional geometry of the cylindrical wall of the cylindrical cavity.

While the principles of the present inventions have now been made clear by the illustrative embodiments, there will be many modifications of the structures, arrangements, proportions, elements and materials, which are obvious to those skilled in the art and particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for handling fluid flow comprising in combination:
    (a) a body including two cylindrical cavities respectively having a smoothly contoured cylindrical surface, a bifurcating inlet connected to first halves of the two cylindrical cavities in a parallel arrangement, and a bifurcating outlet connected to second halves of the two cylindrical cavities opposite to said first halves in a parallel arrangement; each of said two cylindrical cavities including a planar divider member extending diametrically thereacross and disposed in a rotatable arrangement about an axis of rotation parallel and eccentric to the geometrical central axis of said each of the two cylindrical cavities, said planar divider member including a planar cavity disposed in a substantially parallel relationship thereto; and further including a shaft member disposed coaxially to said axis of rotation and rotatably supported by said body, said shaft member including a midsection having an oblong cross section disposed within said planar cavity included in the planar divider member, wherein the midsection of oblong cross section of said shaft member engages said planar cavity included in the planar divider member in a sliding relationship in directions lateral to said axis of rotation and in a nonrotatable relationship therebetween; and
    (b) means for coupling rotating motions of two shaft members respectively included in said two cylindrical cavities in such a way that a phase angle difference generally equal to 90 degrees is maintained between two planar divider members respectively included in the two cylindrical cavities.

2. A combination as set forth in claim 1 wherein said combination includes means for transmitting rotating motion to and from the shaft member.

3. A combination as set forth in claim 1 wherein said combination includes means for measuring rotating speed of the planar divider member about the axis of rotation.

4. A combination as set forth in claim 1 wherein each combination of the cylindrical cavity and the planar divider member includes a plurality of cam followers and cam guides limiting contact pressure between edges of the planar divider member and cylindrical wall of the cylindrical cavity.

5. A combination as set forth in claim 1 wherein each of edges of the planar divider member sliding on cylindrical wall of each of the two cylindrical cavities includes a roller disposed parallel to the edge and rolling on cylindrical wall of the cylindrical cavity.

6. A combination as set forth in claim 1 wherein said combination of the shaft member and the planar divider member includes a plurality of roller bearings disposed intermediate the midsection of said shaft member with an oblong cross section and the wall of the planar cavity included in the planar divider member.

7. An apparatus for handling fluid flow comprising in combination:
(a) a body including two cylindrical cavities respectively having a smoothly contoured cylindrical surface, an inlet flow passage open to first half of one of said two cylindrical cavities, a connecting flow passage connecting second half of said one of the two cylindrical cavities opposite to said first half thereof to first half of the other of the two cylindrical cavities, and an outlet flow passage open to second half of said the other of the two cylindrical cavities opposite to said first half thereof, each of said two cylindrical cavities including a planar divider member extending diametrically thereacross and disposed in a rotatable arrangement about an axis of rotation parallel and eccentric to the geometrical central axis of said each of the two cylindrical cavities, and further including a shaft member disposed coaxially to said axis of rotation and rotatably supported by said body, wherein the shaft member engages the planar divider member in an arrangement allowing sliding movement of the planar divider member in directions lateral to said axis of rotation and nonrotatable relative to the planar divider member;
(b) means for coupling rotating motions of two shaft members respectively included in said two cylindrical cavities in such a way that a phase angle difference generally equal to 90 degrees is maintained between two planar divider members respectively included in the two cylindrical cavities; and
(c) a plurality of cam followers secured to edges of the planar divider member perpendicular to said axis of rotation and engaging circular cam guides limiting contact pressure between edges of the divider member parallel to said axis of rotation and cylindrical wall of the cylindrical cavity.

8. A combination as set forth in claim 7 wherein said combination includes means for transmitting rotating motion to and from the shaft member.

9. A combination as set forth in claim 7 wherein said combination includes means for measuring rotating speed of the planar divider member about the axis of rotation.

10. A combination as set forth in claim 7 wherein each of edges of the planar divider member sliding on cylindrical wall of each of the two cylindrical cavities includes a roller disposed parallel to the edge and rolling on cylindrical wall of the cylindrical cavity.

11. A combination as set forth in claim 7 wherein the engagement between the shaft member and the planar divider member includes a plurality of roller bearings disposed intermediate surfaces under relative sliding movement respectively belonging to the shaft member and the planar divider member.

12. An apparatus for handling fluid flow comprising in combination:
(a) a body including two cylindrical cavities respectively having a smoothly contoured cylindrical surface, an inlet flow passage open to first half of one of said two cylindrical cavities, a connecting flow passage connecting second half of said one of the two cylindrical cavities opposite to said first half thereof to first half of the other of said two cylindrical cavities, and an outlet flow passage open to second half of said the other of the two cylindrical cavities opposite to said first half thereof; each of said two cylindrical cavities including a planar divider member extending diametrically thereacross and disposed in a rotatable arrangement about an axis of rotation parallel and eccentric to the geometrical central axis of said each of the two cylindrical cavities, said planar divider member including a planar cavity disposed in a substantially parallel relationship thereto; and further including a shaft member disposed coaxially to said axis of rotation and rotatably supported by said body, said shaft member including a midsection having an oblong cross section disposed within said planar cavity included in the planar divider member, wherein the midsection of oblong cross section of said shaft member engages said planar cavity included in the planar divider member in a sliding relationship in directions lateral to said axis of rotation and in a nonrotating relationship therebetween;
(b) means for coupling rotating motions of two shaft members respectively included in said two cylindrical cavities in such a way that a phase angle difference generally equal to 90 degrees is maintained between the two planar divider members respectively included in the two cylindrical cavities; and
(c) cam guide-cam follower means for limiting contact pressure between edges of the planar divider member and cylindrical wall of the cylindrical cavity included in each combination of the planar divider member and the cylindrical cavity.

13. An apparatus for handling fluid flow comprising in combination:
(a) a body including two cylindrical cavities respectively having a smoothly contoured cylindrical surface, an inlet flow passage open to first half of one of said two cylindrical cavities, a connecting flow passage connecting second half of said one of the two cylindrical cavities opposite to said first half thereof to first half of the other of said two cylindrical cavities, and an outlet flow passage open to second half of said the other of the two cylindrical cavities opposite to said first half thereof; each of said two cylindrical cavities including a planar divider member extending diametrically thereacross and disposed in a rotatable arrangement about an axis of rotation parallel and eccentric to the geometrical central axis of said each of the two cylindrical cavities, said planar divider member including a planar cavity disposed in a substantially parallel relationship thereto; and further including a shaft member disposed coaxially to said axis of rotation and rotatably supported by said body, said shaft member including a midsection having an oblong cross section disposed within said planar cavity included in the planar divider member, wherein the midsection of oblong cross section of said shaft member engages said planar cavity included in the planar divider member in a sliding relationship in directions lateral to said axis of rotation and in a nonrotating relationship therebetween;

(b) means for coupling rotating motions of two shaft members respectively included in said two cylindrical cavities in such a way that a phase angle difference generally equal to 90 degrees is maintained between the two planar divider members respectively included in the two cylindrical cavities; and (c) roller bearing means disposed intermediate the midsection of the shaft member with an oblong cross section and wall of the planar cavity included in the planar divider member included in each combination of the shaft member and the planar divider member.

* * * * *